(12) United States Patent
Inoko

(10) Patent No.: US 7,613,461 B2
(45) Date of Patent: Nov. 3, 2009

(54) STATION SIDE APPARATUS, RESOURCE ALLOCATING METHOD IN STATION SIDE APPARATUS AND MOBILE COMMUNICATION SYSTEM

(75) Inventor: Katsutoshi Inoko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 758 days.

(21) Appl. No.: 10/914,785

(22) Filed: Jul. 28, 2004

(65) Prior Publication Data
US 2005/0009515 A1 Jan. 13, 2005

Related U.S. Application Data

(63) Continuation of application No. PCT/JP02/01084, filed on Feb. 8, 2002.

(51) Int. Cl.
*H04W 72/00* (2009.01)
*H04W 36/00* (2009.01)
*H04W 4/00* (2009.01)
*H04L 1/00* (2006.01)

(52) U.S. Cl. .................... 455/450; 455/426.2; 455/436; 455/452.2; 455/453; 370/230; 370/235; 370/331; 370/338

(58) Field of Classification Search ............... 455/426.2, 455/436, 450, 453; 370/230, 235, 331, 338
See application file for complete search history.

(56) References Cited

U.S. PATENT DOCUMENTS 6,226,277 B1 5/2001 Chuah
6,411,601 B1* 6/2002 Shaffer et al. ............... 370/230
2001/0031634 A1* 10/2001 Mizutani et al. ............. 455/425
2002/0082018 A1* 6/2002 Coskun et al. .............. 455/439

FOREIGN PATENT DOCUMENTS

JP 11-289341 10/1999

OTHER PUBLICATIONS

Supplementary European Search Report dated Jun. 15, 2007, from the corresponding European Application.
International Preliminary Examination Report dated Oct. 14, 2004.
International Search Report dated May 21, 2002.

* cited by examiner

*Primary Examiner*—Vincent P Harper
*Assistant Examiner*—Ariel Balaoing
(74) *Attorney, Agent, or Firm*—Katten Muchin Rosenman LLP

(57) ABSTRACT

Even if a communication resource needed for connection processing with a user (subscriber terminal) and an actual packet data communication is in a full condition in an active subscriber resource managing unit, when a communication resource needed for only maintaining a logical connection with a user is in a free condition in a dormant subscriber resource managing unit, for accommodating a new user in a dormant state through this free resource, a control unit carries out connection processing answering a new connection request through the use of a radio resource secured in advance or a free radio resource produced by shifting a portion of active users forcibly to a dormant state. This enables using a packet communication total resource without waste and considerably improving the packet service connectivity to a user.

36 Claims, 12 Drawing Sheets

STATION SIDE APPARATUS, RESOURCE ALLOCATING METHOD IN STATION SIDE APPARATUS AND MOBILE COMMUNICATION SYSTEM

CROSS-REFERENCE TO RELATED APPLICATION

The present application is a continuation of International Application No. PCT/JP02/01084 which was filed on Feb. 8, 2002.

TECHNICAL FIELD

The present invention relates to, in a mobile communication system [for example, cellular system, WLL (Wireless Local Loop) system, or the like] designed to make communications through packet data switching, an arrangement for resource management on a base station side in packet data communications.

BACKGROUND ART

FIG. 9 is a block diagram showing one example of a configuration of the existing mobile communication system, and the mobile communication system shown in FIG. 9 comprises, as the subscriber side equipment, for example, subscriber data communication terminals (each of which will be referred to hereinafter as a PC) such as personal computers (PCs) 101a and 101b, a mobile communication terminal 102a connected to the PC 101a and designed to make communications with a station side through the use of a radio interface, and an SU (Subscriber Unit) 102b connected to the PC 101b and designed to make communications through an outside antenna 102c with a station side through the use of a radio interface.

Incidentally, although not shown in FIG. 9, a plurality of mobile communication terminals 102a exist therein. Moreover, the mobile communication terminal 102a is called an MS (Mobile Station) in the cellular system. Still moreover, in the case of the WLL system, means corresponding to the mobile communication terminal 102a is called an FWT (Fixed Wireless Terminal). In the following description, for convenience only, these will collectively be referred to simply as "MS 102a".

On the other hand, as the station side equipment, there are base stations (BTSs: base station transmission subsystems) 103, a base station control unit (BSC) 104, a packet data distribution serving node (PDSN) 105 functioning as a packet processing unit connected to the internet 107, and an ordinary subscriber exchange (LE), mobile subscriber exchange and others functioning as a general speech processing unit 106 connected to a telephone network 108.

In this configuration, each of the BTSs 103 makes communications through a radio interface with the MS 102a (or the SU 102b), and the BSC 104 controls a plurality of BTSs 103 to carry out the call processing for making the interface on the transmission/reception of IP (Internet Protocol) packet data (which will hereinafter be referred to simply as a "packet") or voice data between the BTS 103 and the PDSN 105 or the speech processing unit (LE/MSC) 106. In the following description, the BTS 103 and the BSC 104 will sometimes be referred to simply as a "BS 134".

Moreover, the PDSN 105 carries out the interface in packet transmission/reception between the BSC 104 and the internet 107 and further terminates the point-to-point protocol (PPP) with respect to the PC 101a (or 101b). In this connection, for the user authentication in establishing a PPP link (which is equally referred to as PPP connection) with respect to the MS 102a, this PDSN 105 further carries out the interface with an authentication server 171 in an internet service provider (which will be referred to as an ISP) 170.

With the above-mentioned configuration, in the mobile communication system shown in FIG. 9, in addition to the existing voice communication called a circuit switching type in which communication paths are switched in an exchange and an inter-exchange network, there is realized an internet communication to be made through a packet transmission system (corresponding to the above-mentioned PDSN 105), which is called a packet switching type.

That is, voice data is transmitted between the PC 101a (101b)—the telephone network 108 by way of a path passing through the BTS 103, the BSC 104 and the LE/MSC 106, and packets are transmitted between the PC 101a (101b)—the internet 107 by way of a path passing through the BTS 103, the BSC 104 and the PDSN 105 as indicated by thick solid lines in FIG. 9.

Meanwhile, a feature of the packet data communication (which will hereinafter be referred to simply as "packet communication") is burst-like data occurrence (requiring no real-time property), and a clear line is drawn between a case in which communication takes place (when data is transmitted from a station side to an individual mobile terminal or, conversely, when data is transmitted from a mobile terminal to a station side) and a case in which no communication takes place (when data is not transmitted from a station side to an individual mobile terminal or, conversely, when data is not transmitted from a mobile terminal to a station side). For this reason, although the connection is made between the MS 102a and the BS 134, there occurs a time in which packet (user data) transfer does not take place.

In addition, differing originally from a common 2W (way) telephone system, the mobile communication system described above is realized in a manner such that a plurality of MSs 102a share an air interface between the BS 134 and the MSs 102a and it is not designed such that the ruled MSs 102a can always establish the connection simultaneously (the concentration is made between the BS 134 and the MSs 102a). That is, limitation is imposed on the radio channel resource (which is a resource to be used for the radio communications in a radio zone between MS and BTS, for example, including predetermined radio frequency, diffusion code, time slot, memory, power of BTS, and others) (which will be referred to hereinafter as a "radio resource").

Accordingly, in the case of the packet communications in a mobile communication system, in light of the behavior occurring when a user accesses the packet communication service (burst-like data occurrence forming a feature of the packet communication) and the desire on the effective utilization of the network side resource, the time in which the data transfer does not take place is allocated for the connection to the other users (MSs 102a), thereby achieving the effective utilization of the radio resource.

For realizing this, in the case of the packet communication in the mobile communication system, the standard defines an ACTIVE state and a DORMANT state as in-network call states peculiar to the packet communication.

In this case, for example, as illustratively shown in FIG. 10, the ACTIVE state signifies that "in a state where secured are all the communication resources between the MS 102a and the BS 134 needed for carrying out the packet communication service, in addition to the establishment of a connection A (radio channel), a logical connection B (PPP link) is established between the PC 101a connected to the MS 102a and the PDSN 105 and the transmission/reception is made between the PC 101a (101b) and the internet 107 on these connections A and B".

On the other hand, the DORMANT state represents that "of the aforesaid connection A and the connection B, the connection A (radio channel) is placed into a released state while the connection B (PPP link) is in a maintained state". That is, in the DORMANT state, the connection A is apparently made from the MS 102a to the PC 101a and from the BS 134 to the PDSN 105.

Therefore, when gaining the access from the PC 101a to the internet 107 through the use of the packet communication service, a user is not aware of the difference between the ACTIVE/DORMANT states forming the in-network call states. In this connection, one example of state transition of the ACTIVE/DORMANT states are mentioned hereinbelow.

(1) A user (subscriber) starts the access from the PC 101a (or 101b) to the internet 107.

(2) A user reads various home pages (WWW: World Wide Web) on the PC 101a (or 101b) [frequency occurrence of packets (traffic data): ACTIVE state].

(3) A user is carefully reading a given home page on the PC 101a (or 101b) (absence of traffic data).

(4) When the traffic data disappears due to the aforesaid (3), a timer starts in the MS 102a (or the SU 102b) or in the BS 134.

(5) Communication is made between the BS 134 and the MS 102a (or the SU 102b) at the time runout, thereby making the transition to the DORMANT state.

(6) A user is carefully reading a home page on the PC 101a (101b).

(7) In a case in which a user operates the PC 101a (or 101b) for reading a different home page, or when traffic data addressed to the PC 101a (101b) is sent from the internet 107 side to a user, a connection (connection A in FIG. 10) is established between the BS 134 and the MS 102a to set a state (ACTIVE state) in which the traffic data is transmittable/receivable.

Incidentally, the definitions of the ACTIVE state and the DORMANT state can depend upon the standard, and the distinction can also be made as a state in which the packet communication can be started through the use of the resource needed for the PPP link and secured by the radio resource securement.

Moreover, a user who is in the aforesaid ACTIVE state is referred to as an ACTIVE user, while a user who is in the DORMANT state is referred to as a DORMANT user. That is, the ACTIVE user denotes a user who actually accesses the packet communication service (user for which the radio resource is secured), while the DORMANT user depicts a user who once makes the packet communication as the ACTIVE user and then releases only the radio resource between the MS 102a (or 102b) and the BS 134 (the resource needed for a high-order PP link is maintained) at the elapse of a predetermined period of time after the packet transmission comes to an end.

In addition, in the mobile communication system, the upper limit of the number of simultaneous connections, i.e., the upper limit of the physical resources, is determined by the numbers of ACTIVE users and DORMANT users and is managed by the BSC 104. Therefore, whether a new packet communication call is established or not depends upon the number of ACTIVE users.

Concretely, when the number of ACTIVE users reaches the upper limit, since the communication resource for a new ACTIVE user does not exist, the present BSC 104 rejects a new call (new connection request) even if there exists a free DORMANT resource. For example, as shown in FIG. 11, assuming that each of the upper limits of numbers of ACTIVE users and DORMANT users is "30" (that is, users up to "60" can be accommodated), when a new connection request occurs in a state where the ACTIVE users reach the upper limit ("30"), the BSC 104 rejects this request though the DORMANT users do not reach the upper limit ("2" at present).

This is because a user is first required to become the ACTIVE user (a radio channel is allocated thereto) for becoming the DORMANT user and only the DORMANT user who has once been placed into the ACTIVE state can make the transition to the ACTIVE state through the re-securement of the radio resource.

For this reason, for example, as shown in FIG. 12, in a case in which the upper limit of number of ACTIVE users is "1" and the number of DORMANT users is equal to or more than 2, a terminal (PC) Y cannot start the packet communication except for making a connection request accidentally after the time T2 at the soonest, that is, after a terminal (PC) X already coming into the ACTIVE state through the authentication with the authentication service 171 of the ISP 170, which has been made in response to a dial-up connection request, shifts to the DORMANT state stemming from the fact that a state of no packet transmission/reception continues for a period of time T2 subsequently.

Accordingly, the maximum accommodation capacity of the packet communication initially estimated decreases and the occurrence of claims on the poor connections from the subscribers is expectable.

The present invention has been developed in consideration of these problems, and it is therefore an object of the invention to suppress the decrease in subscriber accommodation capacity of the packet communication in a manner such that, even if the number of ACTIVE users reaches the upper limit, when a free MS shiftable to the DORMANT state (allowable MS within the limitation on resource such as PPP connection resource) exists, new call connection processing is conducted through the use of a PPP connection resource already secured by the acquisition of at least a radio resource, or the like, for accommodating a new user as a DORMANT user which is in an immediately packet-communicable state.

DISCLOSURE OF INVENTION

For achieving the aforesaid purpose, in accordance with the present invention, a station side apparatus is made to manage a communication resource needed for making packet data communication with a plurality of subscriber terminals and to allocate the communication resource to the subscriber terminal according to a connection request from the subscriber terminal for making the packet data communication with the subscriber terminal and is characterized by comprising the following components:

(1) an active subscriber resource managing unit for managing a communication resource needed for implementing connection processing in which, in response to a connection request from one subscriber terminal, a communication link with this subscriber terminal is established so that packet data communication with the subscriber terminal is placed into an active state;

(2) a dormant subscriber resource managing unit for managing a communication resource needed for maintaining a communication link other than at least a radio zone when the subscriber terminal which is in the active state shifts to a dormant state in which no packet data transmission actually takes place;

(3) a dormant state shift resource managing unit for managing a radio resource to be used for the subscriber terminal to be shifted to the dormant state after the implementation of the connection processing; and (4) a control unit for, upon receipt of a new connection request from a subscriber terminal which is not in the active state nor in the dormant state, even if a free radio resource is absent in the active subscriber resource managing unit, when a free communication resource exists in the dormant subscriber resource managing unit, carrying out connection processing answering the new connection request through the use of a radio resource in the dormant state shift resource managing unit to control packet data communication with the subscriber terminal issuing the new connection request into an active state.

In the station side apparatus according to the present invention, thus configured, even in a case in which a new connection request occurs from one subscriber terminal (which will hereinafter be referred to simply as a "subscriber") in a state where no active subscriber resource exists, if a dormant subscriber resource is in a free condition, the connection processing answering the new connection request is conducted through the use of a radio resource secured as a spare in advance in the dormant state shift resource managing unit and, hence, the subscriber can establish a communication link with respect to the station apparatus to actually make the packet data communication (which will hereinafter be referred to simply as "packet communication").

In other words, when a connection request occurs from one subscriber terminal, even if a free radio channel runs short, the connection to that subscriber terminal through a radio channel is permitted on the condition that that subscriber terminal is at least once exposed to the release of a radio resource.

Therefore, this can avoid the phenomenon that, even if a free dormant subscriber resource exists, a new connection request is rejected because of the absence of the active subscriber resource, which occurs in the case of the conventional technique, and enables the use of the total resource needed for the packet communication without waste, thus enhancing the subscriber's connectivity to the packet communication service.

In addition, a station side apparatus according to another present invention is characterized by comprising the following components:

(1) an active subscriber resource managing unit for managing a communication resource needed for implementing connection processing in which, in response to a connection request from one subscriber terminal, a communication link with the subscriber terminal is established so that packet data communication with the subscriber terminal is placed into an active state;

(2) a dormant subscriber resource managing unit for managing a communication resource needed for maintaining a communication link other than at least a radio zone when the subscriber terminal placed into the active state is shifted to a dormant state in which no packet data transmission actually takes place; and (3) a control unit for, upon receipt of a new connection request from a subscriber terminal which is not in the active state nor in the dormant state, forcibly shifting a portion of subscriber terminals placed into an active state to a dormant state to produce a free resource from a radio resource and for carrying out connection processing answering the new connection request through the use of that free radio resource to control packet data communication with the subscriber terminal issuing the new connection request into an active state.

That is, in the station side apparatus with this configuration, instead of securing a radio resource in advance, a portion of subscribers which are in the active state is forcibly shifted to the dormant state to produce a free radio resource for implementing the connection processing answering a new connection request through the use of the free radio resource, thereby realizing the connection processing for the new subscriber in a state where a free active subscriber resource is absent but a free dormant subscriber resource is present.

Accordingly, also in this case, it is possible to use the total resource needed for the packet communication without waste and to enhance the connectivity of the packet communication service to the subscribers.

In this connection, it is preferable that a subscriber newly connected to the packet communication service is forcibly shifted to a dormant state afterwards. Moreover, the subscriber which has been in the active state but forcibly shifted to the dormant state for the connection processing on a new subscriber can also be returned to the active state afterwards. This can achieve more effective utilization of the total resource needed for the packet communication.

Furthermore, as the criteria for the determination of a subscriber of the active-state-placed subscribers which is to be forcibly shifted to the dormant state as mentioned above, various kinds of conditions are conceivable. For example, the subscriber to be forcibly shifted from the active state to the dormant state can be determined on the basis of the elapsed time after the subscriber comes into the active state, the management number of the subscriber which has come into the active state, the number of times of state transition of the subscriber to the active state and the dormant state within a constant period of time, the time to be taken from when the subscriber comes into the active state until it shifts to the dormant state, or the like.

Therefore, the required criterion (condition) can be set in accordance with the system requirements, and it is possible to reduce that the subscriber to be forcibly shifted from the active state to the dormant state inclines toward a portion of subscribers.

BEST MODE FOR CARRYING OUT THE INVENTION (A) DESCRIPTION OF FIRST EMBODIMENT

Figure 1:
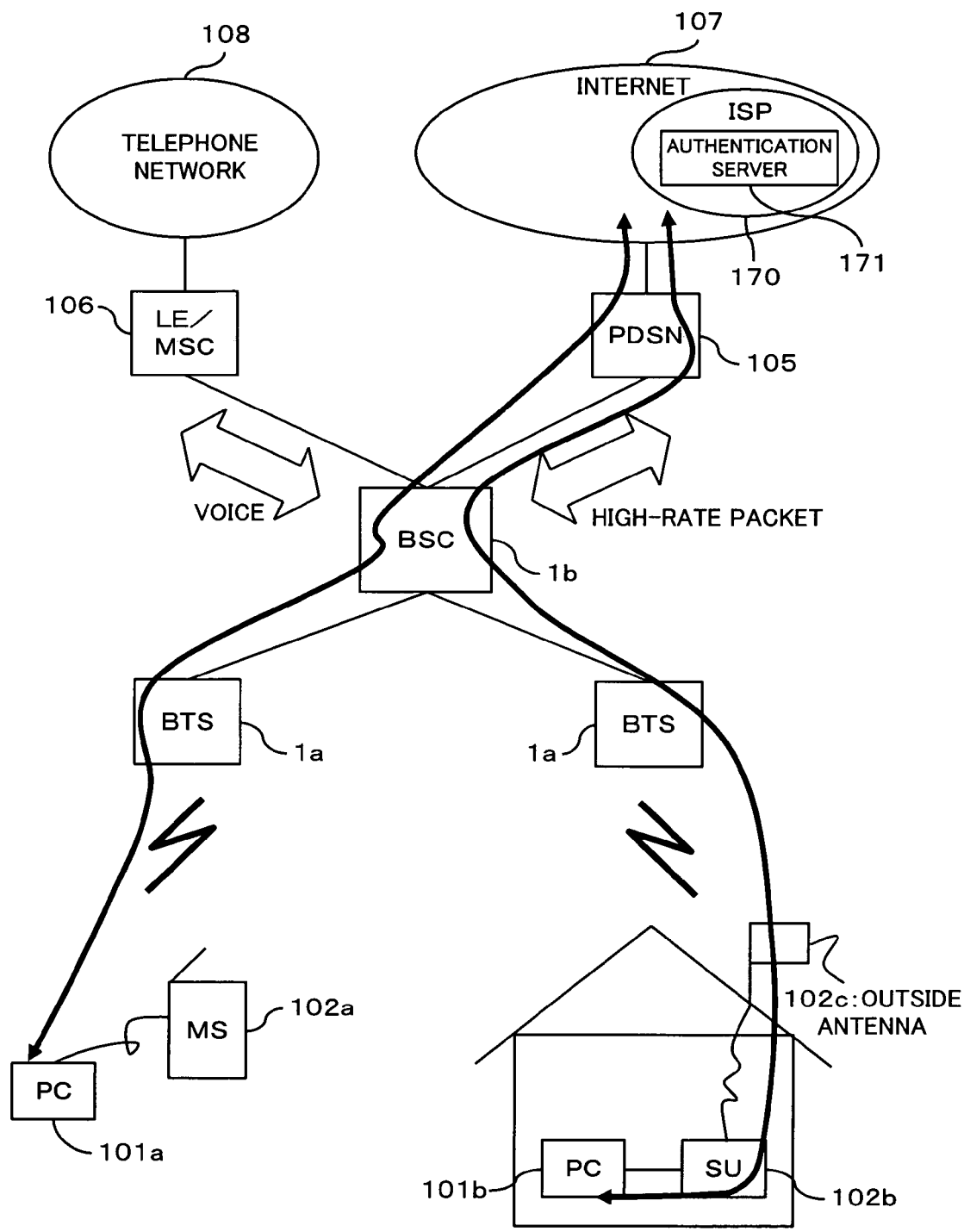
FIG. 1 is a block diagram showing a configuration of a mobile communication system according to a first embodiment of the present invention.
Figure 9:
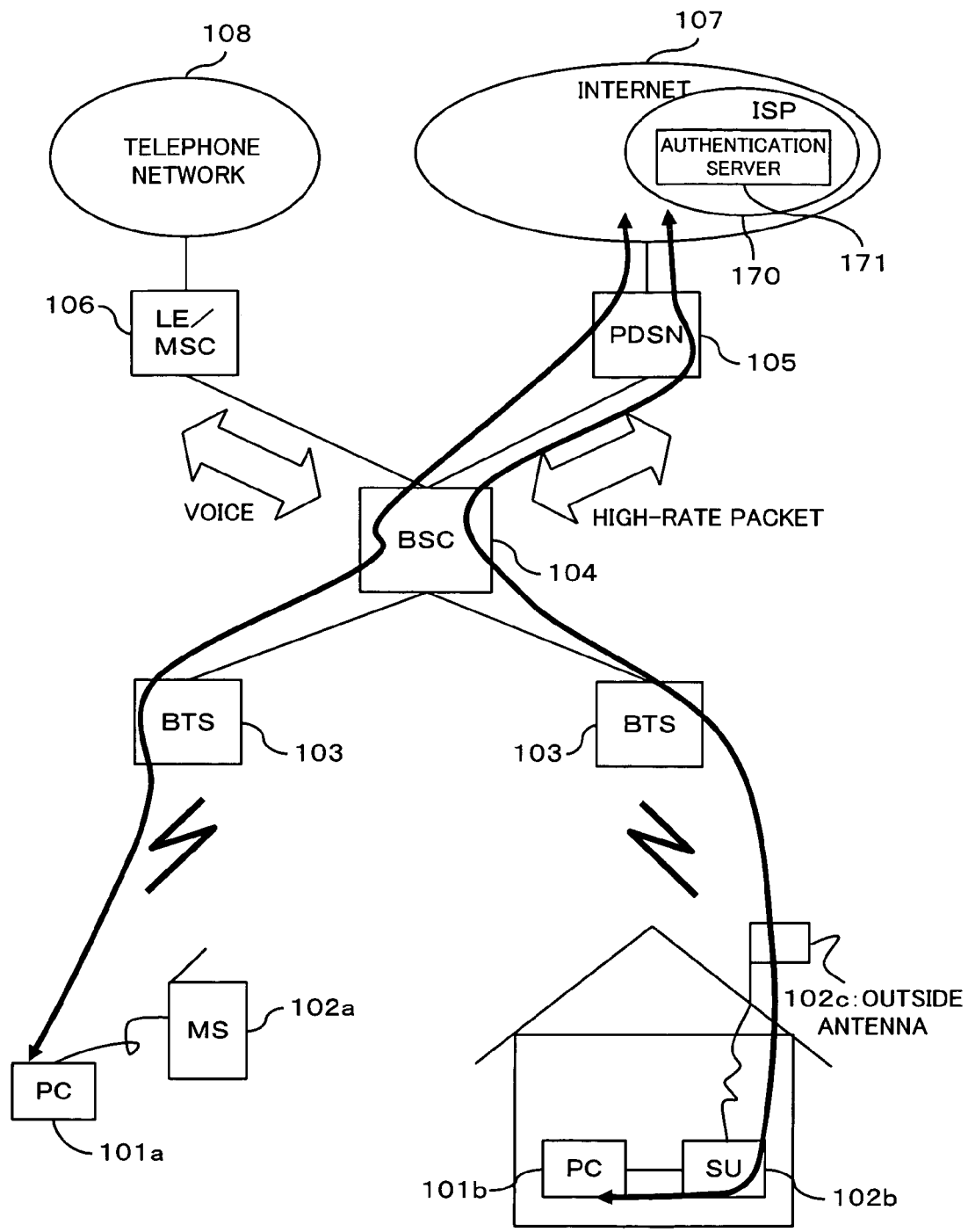
FIG. 9 is a block diagram showing one example of a configuration of the existing mobile communication system.

FIG. 1 is a block diagram showing a configuration of a mobile communication system according to a first embodiment of the present invention. In FIG. 1, parts marked with the same reference numerals as those used in FIG. 9 have the same or equivalent functions as/to those mentioned above with reference to FIG. 9. However, in the system shown in FIG. 1, instead of the base station (BTS) 103 and the base station control unit (BSC) 104 in FIG. 9, BTSs 1b and a BSC 1a are employed as station side equipment (apparatus).

Also in this embodiment, each of the BTSs 1a is connected through a radio interface (radio channel) to an MS 102a (or SU 102b) to make communications through the radio channel, and the BSC 1b is designed to control these BTSs 1a for carrying out the call processing to make the interface on the transmission/reception of IP packet data (which will hereinafter be referred to simply as a "packet") or voice data between the BTS 1a and a PDSN (logical connection unit) 105 or a speech processing unit (LE/MSC) 106.

Moreover, in the packet communication, this BSC 1b is made to establish a logical connection (PPP link which will be mentioned later) with the MS 102a (or the SU 102b) through the use of the aforesaid radio channel between the MS 102a (or the SU 102b) and the BTS 1a with the radio channel being used as a portion (radio zone) of the transmission path. In the following description, for convenience only, these BTS 1a and BSC 1b are collectively referred to simply as a "BS 1".

Figure 2:
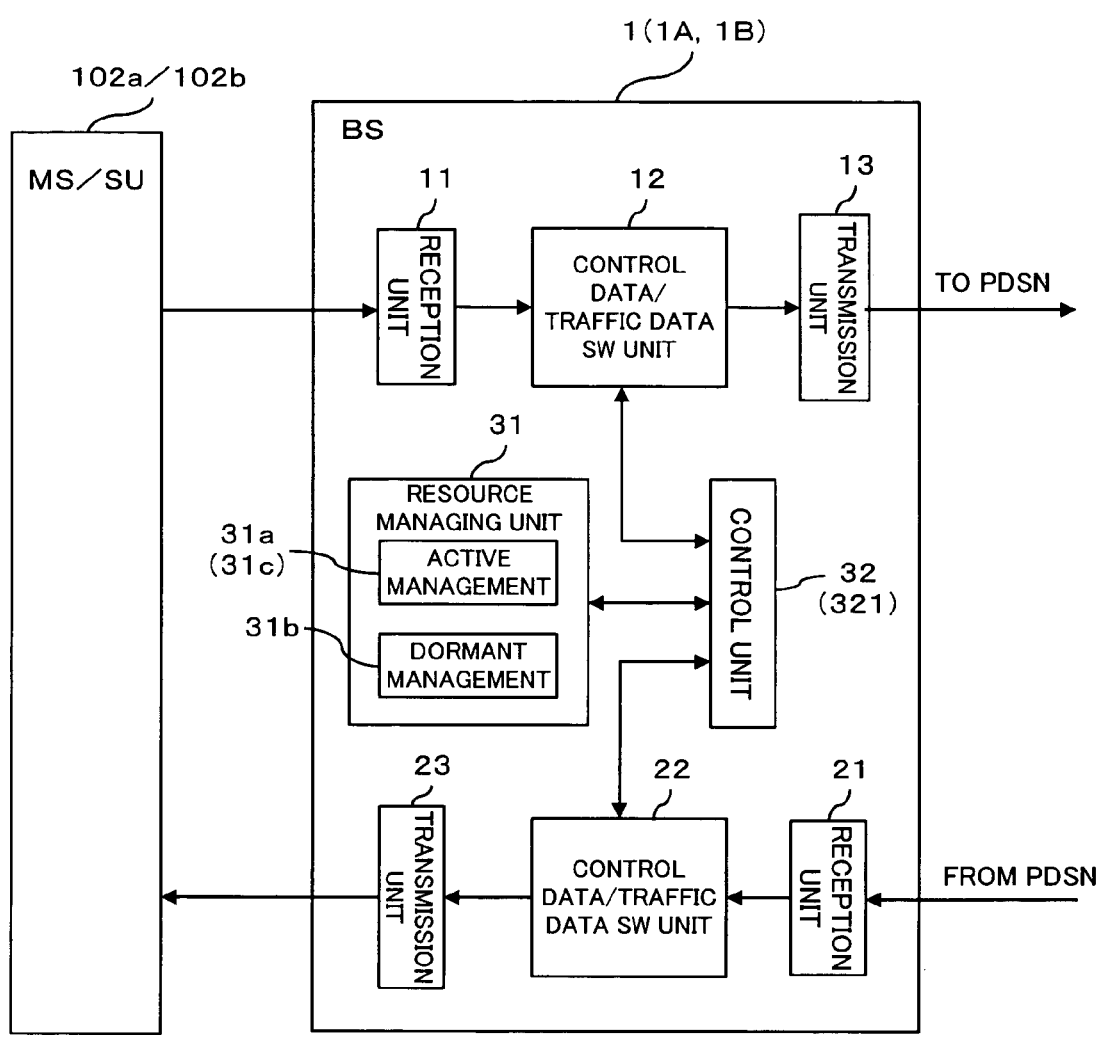
FIG. 2 is a block diagram showing configurations of essential parts of a base station and a base station control unit shown in FIG. 1.

Paying notice to the functions of an essential part of this BS 1, in this embodiment, the BS 1 is configured, for example, as shown in FIG. 2. That is, the BS 1 is made up of reception units 11, 21, a control data/traffic data switching units 12, 22, transmission units 13, 23, a resource managing unit 31, and a control unit 32.

In this configuration, the aforesaid reception unit 11 is for receiving data (traffic data (voice data or packet data) or control data) transmitted from a PC 101a or 101b (MS 102a or SU 102b) through a radio interface, and the control data/traffic data switching unit 12 (which will hereinafter be referred to simply as a "data switching unit 12") is for carrying out a switching operation so that, of the data received by the reception unit 11, control data (for example, packet connection request, PPP connection request, or the like, which will be mentioned later) is transferred to the control unit 32 while traffic data other than that is transferred to the next-stage transmission unit 13.

Moreover, the transmission unit 13 is for transmitting the traffic data coming from the aforesaid data switching unit 12 to the PDSN 105 or the LE/MSC 106 and, at this time, packet data is sent to the PDSN 105 while voice data is fed to the LE/MSC 106.

On the other hand, the reception unit 21 is for receiving traffic data 21 transmitted from the PDSN 105 (or the LE/MSC 106), and the control data/traffic data switching unit 22 (which will hereinafter be referred to simply as a "data switching unit 22") is for conducting a switching operation so that, of the data received by the reception unit 21, control data (for example, a traffic channel assign instruction, a response message, or the like, which will be mentioned later) is sent to the control unit 32 while traffic data is sent to the next-stage transmission unit 23, and the transmission unit 23 is for transmitting the traffic data sent from the data switching unit 22 through a radio interface to the MS 102a or the SU 102b.

Figure 10:
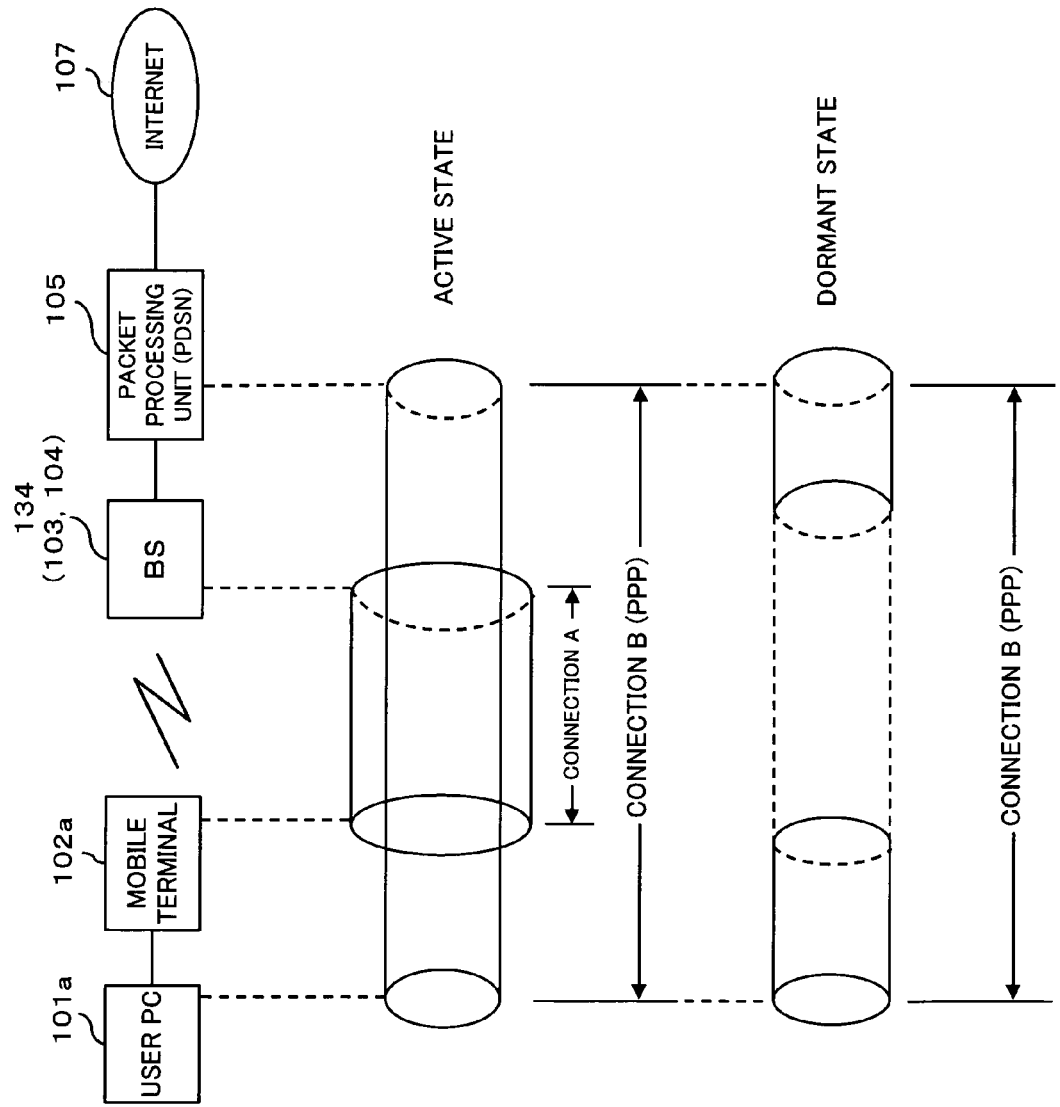
FIG. 10 is a block diagram for explaining an ACTIVE state and a DORMANT state.

Still moreover, the resource managing unit 31 is principally for managing a communication resource needed for packet communication with the MS 102a or the SU 102b and, in this case, it is for managing a communication resource (principally, a resource needed for establishing a PPP link or a radio connection, or for others) allocable separately to the MS 102a (101a) or the SU 102b (10b) (sometimes, which will hereinafter be referred collectively to simply as "user (subscriber)") which is in the ACTIVE/DORMANT state. Incidentally, also in this embodiment, the "PPP link (communication link)" depicts a connection corresponding to the connection B in FIG. 10, and the "radio connection" denotes a connection corresponding to the connection A in FIG. 10.

Thus, as shown in FIG. 2, the aforesaid resource managing unit 31 is additionally equipped with an ACTIVE user resource managing unit 31a and a DORMANT user resource managing unit 31b.

In this case, the ACTIVE user resource managing unit 31a is for establishing a radio channel and a PPP link (which will hereinafter be referred to equally as a PPP connection) with respect to a user in response to a packet connection request and a dial-up connection request from this user and is for managing a communication resource (a radio resource, a PPP connection resource, or the like ACTIVE user resource) needed for carrying out the connection processing to actually place the packet communication into an ACTIVE state.

In this connection, this ACTIVE user resource managing unit 31a also functions as a DORMANT immediate-shift resource (dormant state shift resource) managing unit 31c to manage a portion (radio resource) of the ACTIVE user resource as a "radio resource (dormant state shift resource) for shifting immediately to a DORMANT state" in advance.

This "radio resource for shifting immediately to a DORMANT state" (which will hereinafter be referred to simply as a "DORMANT immediate-shift resource") signifies a radio resource allocated to an MS on the premise (condition) that, after the connection is once made as an ACTIVE user, the shifting is immediately made forcibly to a DORMANT user and, even if placed into an ACTIVE state, the radio resource allocated MS is shifted to the DORMANT state without waiting the elapse of a predetermined period of time which usually causes the transition from an ACTIVE state to a DORMANT state. A resource allocation operation using this DORMANT immediate-shift resource will be described in detail later.

Meanwhile, as described above with reference to FIG. 10, the DORMANT user resource managing unit 31b is for managing, as a DORMANT user resource, a communication resource (except a radio resource) needed for maintaining at least a PPP connection (communication link other than a radio zone) when a user which is in an ACTIVE state is actually shifted to a DORMANT state where no transmission of packet data takes place. Therefore, the DORMANT user can become an ACTIVE user without securing a radio resource but by again securing a radio resource.

Moreover, the control unit 32 is principally made to, in response to a connection request sent from the MS 102a or PDSN 105 in the form of control data, allocate, of the resources placed under the management of the aforesaid resource managing unit 31 (ACTIVE user resource managing unit 31a), a resource needed for connection processing (establishment of PPP connection and radio connection) to the connection request issuing user for controlling the communication with this user into an ACTIVE state. In fact, this control is implemented by carrying out the routing setting on the data switching units 12 and 22 for packets flowing therein.

Still moreover, in addition to this basic function, this control unit 32 issues a resource check request to the resource managing unit 31 when receiving a new packet connection request from a user which is not in an ACTIVE state nor in a DORMANT state. Even in a case in which no ACTIVE user resources are in a free condition, if a DORMANT resource placed under the management of the DORMANT user resource managing unit 31b is in a free condition, the ACTIVE user resource managing unit 31a notifies, to the control unit 32, the permission-to-use on a radio resource placed under the management of the aforesaid DORMANT immediate-shift resource managing unit 31c so as to accommodate a new user as a DORMANT state through the use of the free resource.

Through the use of this radio resource, the control unit 32 establishes a radio channel with an MS (establishing by controlling so that the transmission unit 23 and the reception unit 11 use this radio resource) and, for a subsequent PPP connection request, further issues a resource acquisition request for the PPP connection to the resource managing unit 31, then establishing the PPP connection upon receipt of a response thereto. Thus, this user comes into an ACTIVE state.

A detailed description will be given hereinbelow of a resource allocation operation of the BS 1 in the mobile communication system thus configured according to this embodiment.

(1) Normal Time (When ACTIVE User Resource is in Free Condition)

Figure 3:
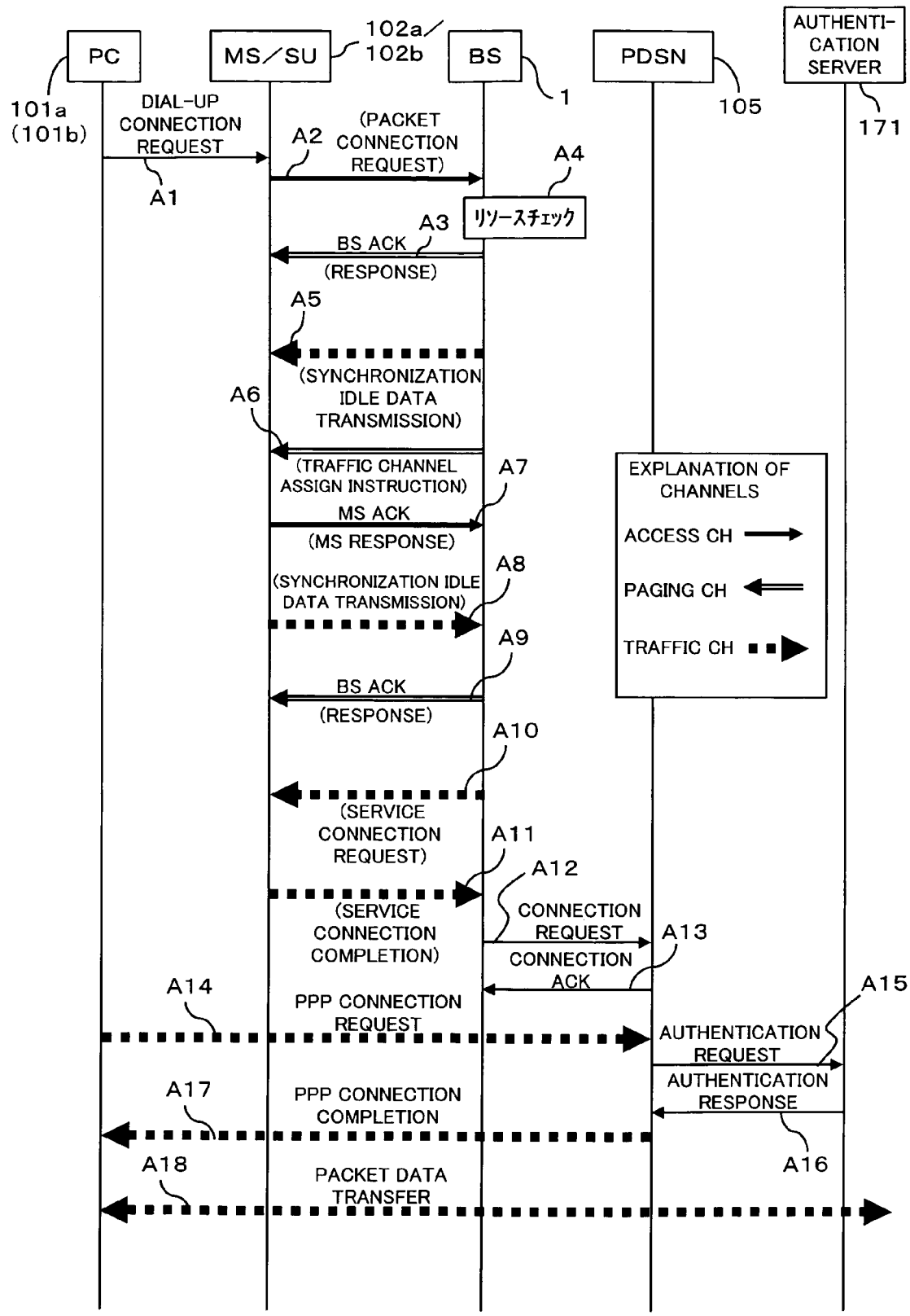
FIG. 3 is a sequence diagram for explaining connection processing (at normal time) in the mobile communication system shown in FIG. 1.

As shown in FIG. 3, first, when a dial-up connection request is issued from the PC 101a (101b) (step A1), this dial-up connection request is accepted by the MS 102a (102b) and transmitted as a packet connection request (Origination message) through an access channel (Access CH) between it and the BS 1 to the BS 1 (step A2).

This packet connection request is received by the reception unit 11 of the BS 1, and it is decided as one type of the control data in the data switching unit 12 and handed over to the control unit 32. Then, through the use of a paging channel (Paging CH), the control unit 32 transmits a response message (BS Acknowledgement message) to this packet connection request to the packet connection request issuing MS 102a (102b) (step A3), and confirms (performs resource check) the present using situation of a resource placed under the management of the resource managing unit 31 (step A4).

If the result of this resource check shows the presence of a free active user resource, the control unit 32 performs the allocation of a needed resource to place the connection request issuing user into an ACTIVE state, and produces synchronization idle data (Null Traffic channel data) to synchronize with the MS 102a (SU 102b) for transmitting the synchronization idle data through a traffic channel (Traffic CH) to the MS 102a (SU 102b) (step A5), and further transmits a traffic channel assign instruction (Extended Channel Assignment) to be used in the MS 102a (SU 102b) through a paging channel (Paging CH) to the MS 102a (SU 102b) (step A6)

Upon receipt of this traffic channel assign instruction, the MS 102a (SU 102b) transmits a response message (MS Acknowledgement message) to the traffic channel assign instruction from the MS 1 through the assigned traffic channel to the MS 102a (SU 102b) (step A7). Following this, the MS 102a (SU 102b) uses the traffic channel (which will hereinafter be referred to as an assigned traffic channel) assigned by the MS 1 for the data transmission to the MS 1.

Thereafter, the MS 102a (SU 102b) produces synchronization idle data to synchronize with the MS 1 and transmits it through the assigned traffic channel to the BS 1 (step A8), and in the BS 1, the control unit 32 transmits a response message (BS Acknowledgement message) to the reception of this synchronization idle data through a paging channel to the MS 102a (SU 102b) (step A9).

In addition, the control unit 32 of the MS 1 transmits a service connection request (Service Connect message) through the assigned traffic channel to the MS 102a (SU 102b) (step A10), and the MS 102a (SU 102b) transmits a service connection completion notification (Service Connect Completion message), as a response to this service connection request, through the assigned traffic channel to the BS 1 (step A11).

Upon receipt of this service connection completion notification, the BS 1 (control unit 32) issues a connection request to the PDSN 105 (step A12), and when receiving this connection request, the PDSN 105 returns a connection response to the BS 1 (step A13) Following this, a PPP connection request is issued from the PC 101a (10b) to the PDSN 105 (step A14) and, when receiving this PPP connection request, the PDSN 105 transmits an authentication request to the ISP 170 (authentication server 171) (step A15).

Upon receipt of the aforesaid authentication request, the authentication server 171 carries out the authentication processing to confirm whether or not the connection request is from a normal user, and returns the authentication result (OK/NG) as an authentication response to the PDSN 105 (step A16) If the authentication result received from the authentication server 171 shows OK, the PDSN 105 issues a PPP connection completion notification to the connection request issuing PC 101a (10b) (step A17).

The user authentication in the ISP 170 and the allocation of an IP address to the PC 101a (101b) are made in this way to establish the PPP link between the PC 101a (101b) and the internet 107 (ISP 170) and the packet data transfer becomes feasible (ACTIVE state) between the PC 101a (101b) and the internet 107 (ISP 170) (step A18).

(2) Case in Which ACTIVE User Resources are not in Free Condition

Secondly, a detailed description will be given hereinbelow of an operation to be conducted when the result of the aforesaid resource check (step A4) indicates that no active user resource is in a free condition.

Figure 4:
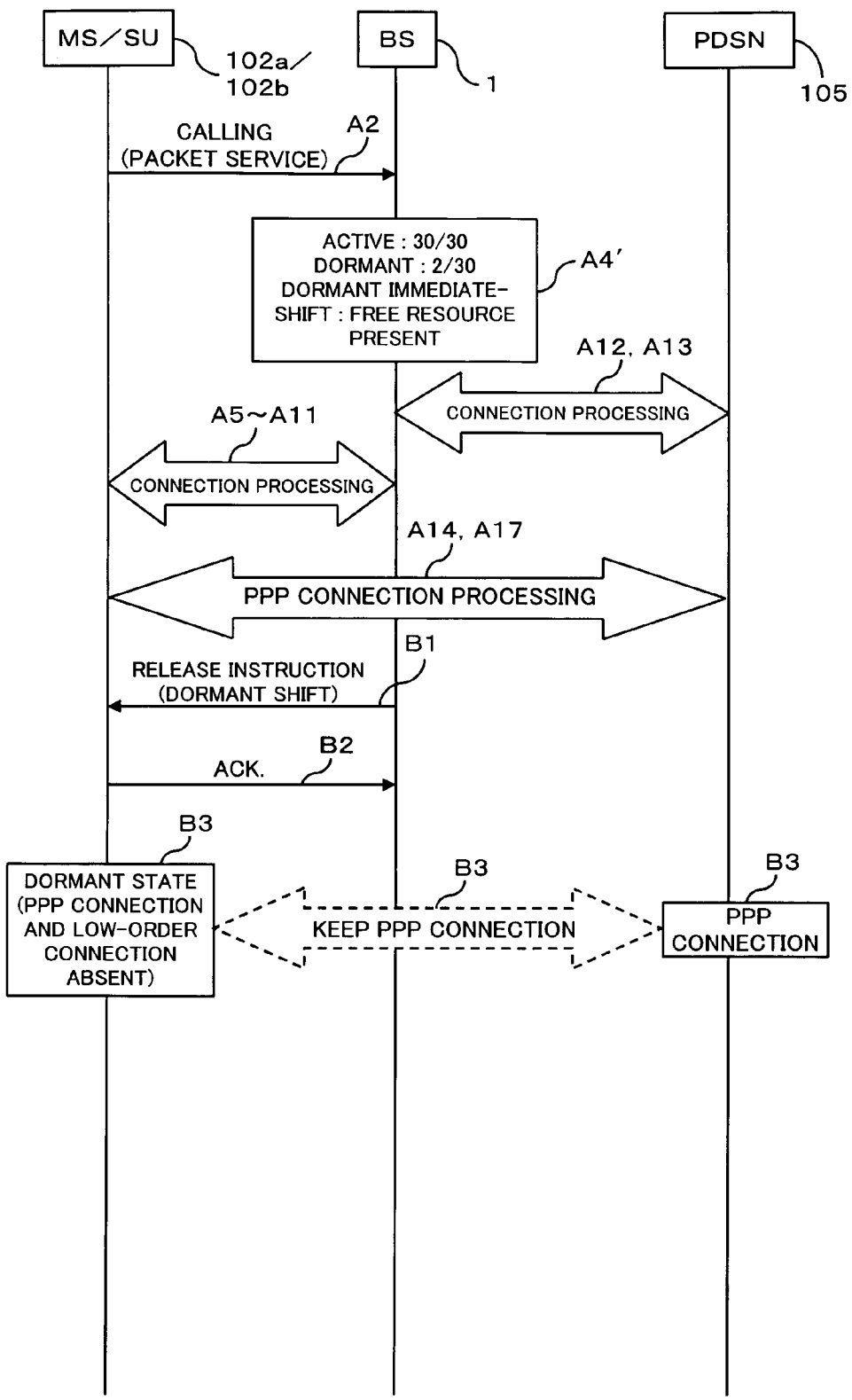
FIG. 4 is a sequence diagram for explaining connection processing (when an ACTIVE user resource is not free) in the mobile communication system shown in FIG. 1.

That is, for example, as shown in FIG. 4, let it be assumed that, in a state where the upper limit of the ACTIVE user resource is 30 and the 30 resources are occupied at present while the upper limit of the DORMANT user resource is 30 and only two resources are occupied at present, a new user (PC 101a/101b) (which is not in an ACTIVE state nor in a DORMANT state) makes a dial-up connection (issues a new connection request) (step A2).

In this case, the control unit 32 checks whether or not a "DORMANT immediate-shift resource" is in a free condition, for that no ACTIVE user resource is in a free condition but a DORMANT user resource is in a free condition (that is, a radio resource (however, except the "DORMANT immediate-shift resource") between the MS 102a/SU 102b and the BS 1 is not in an opening condition but a resource for the PPP link is in an opening condition) (step A4'). If it is in a vacant condition, the control unit 32 allocates the "DORMANT immediate-shift resource" as a resource needed for the connection processing answering a new connection request.

Thus, the needed radio connection processing between the MS 102a (SU 102b)—the BS 1 and between the BS 1—the PDSN 105 are conducted like the procedure described above with reference to FIG. 3 so that a PPP link is established between the MS 102a (SU 102b)—the PDSN 105 and a new user becomes an ACTIVE state.

Following this, for forcibly placing the user, which has newly become the ACTIVE state, into a DORMANT state, the BS 1 (control unit 32) issues a radio connection release instruction to the MS 102a (SU 102b) (step B1) and, upon receipt of this release instruction, the MS 102a (SU 102b) releases the radio connection with respect to the BS 1 and returns a response to the release instruction to the BS 1 (step B2). This makes the user, which is newly in the ACTIVE state, become the DORMANT state (step B3). At this time, the DORMANT immediate-shift resource managing unit 31c releases the radio channel for the immediate shift to the DORMANT state, allocated to the MS 102a.

In this connection, at this time, the BS 1 (resource managing unit 31) manages this user as a DORMANT user. Therefore, in the resource managing unit 31, the number of ACTIVE user resources reaches the upper limit (30), and the number of DORMANT user resources is increased by one to become three. Also on the MS 102a (SU 102b) side, the management is conducted in like manner.

As described above, in the BS 1 according to this embodiment, of the ACTIVE user resources, a given amount of radio resource is secured at all times, and even in a case in which the ACTIVE users reach the upper limit or when a new call (new connection request) occurs in a state where no ACTIVE user resource is in a free condition, if a free resource exists in the DORMANT user resources, since the connection processing is conducted using the given amount of radio resource secured and a new user is once placed into an ACTIVE state and then shifted to a DORMANT state without making it a condition of the time-out of the aforesaid predetermined period of time, unlike the conventional technique, it is possible to avoid to the utmost that, although a DORMANT user resource is in a free state, a new call is rejected because no ACTIVE user resource is in a free condition.

This can effectively utilize the resources, placed under the management of the BS 1, to the fullest extent to suppress the decrease in number of users (ACTIVE users+DORMANT users) which can be accommodated in the BS 1. Moreover, when viewed from the user side, even if the number of ACTIVE users is in a full state, the connection is feasible when there is a room in the number of the DORMANT users and, hence, the number of times of connection busy decreases considerably and the early connection becomes feasible, which leads to the reduction of claim.

(B) DESCRIPTION OF SECOND EMBODIMENT

Although in the above-described embodiment a portion of radio resources is secured in advance to realize the connection processing on a new user in a state where no ACTIVE user resource is in a free condition, as another method, it is also possible to realize it by forcibly shifting a portion of users, which are in an ACTIVE state, to a DORMANT state for creating a free radio resource.

In this case, in the resource managing unit 31 of the BS 1, the ACTIVE user resource managing unit 31a is not required to have a function as the aforesaid DORMANT immediate-shift resource managing unit.

On the other hand, the control unit 32 is principally equipped with a function as a DORMANT shift terminal determining unit 321 (see FIG. 2) to determine a user, to be forcibly shifted to a DORMANT state, on the basis of a predetermined condition when receiving a new connection request in a state where no free ACTIVE user resource (radio resource) exists and a free DORMANT user resource exists, a function to shift the determined ACTIVE user to a DORMANT state (release a radio connection) for making an ACTIVE user resource free, a function to carry out the connection processing on a new user through the use of the created free radio resource, and others.

Figure 5:
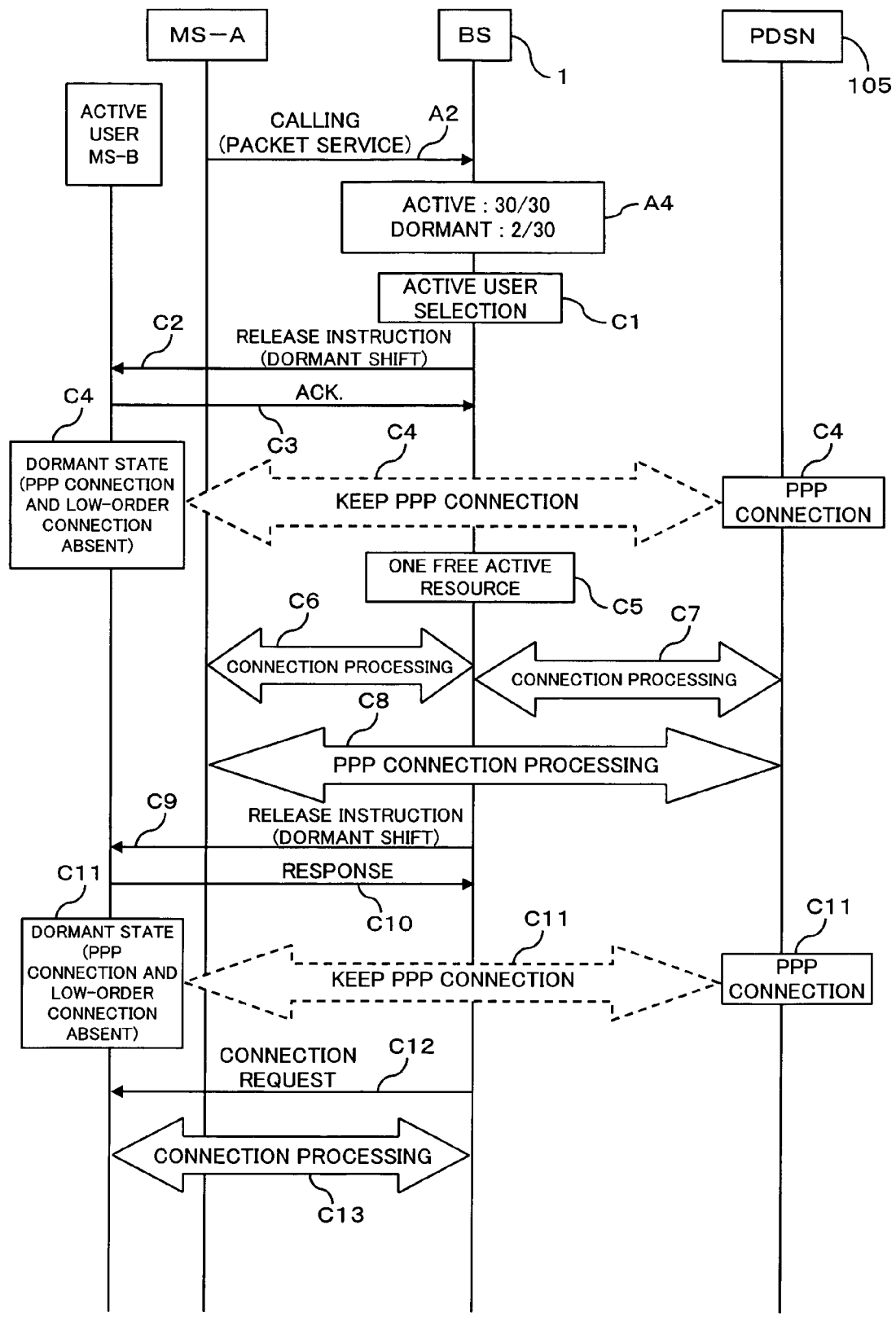
FIG. 5 is a sequence diagram for explaining connection processing (when an ACTIVE user resource is not free) in a mobile communication system according to a second embodiment of the present invention.

Referring to FIG. 5, a detailed description will be given hereinbelow of the connection processing in this case. Incidentally, in this second embodiment, a connection sequence at normal time is similar to the sequence described above with reference to FIG. 3.

Also in this case, first, let it be assumed that a dial-up connection is implemented (a new connection request is issued) on a new user (MS-A) (which is not in an ACTIVE state nor in a DORMANT state) in a state where the ACTIVE user resource upper limit is 30 and the 30 resources are used at present while the DORMANT user resource upper limit is 30 and only two resources are used at present (step A2).

In this case, the control unit 32 of the BS 1 selects (determines), of the users which are currently in an ACTIVE state, one (MS-B) to be forcibly shifted to a DORMANT state through the use of the DORMANT shift terminal determining unit 321 because no ACTIVE user resource is in a free condition while a DORMANT user resource is in a free condition (that is, no free radio resource exists between the MS 102a/SU 102b and the BS 1 while a free resource exists for the PPP link) (step C1). A determination criterion in the DORMANT shift terminal determining unit 321 in this case will be mentioned later.

In addition, the control unit 32 issues a radio connection release instruction to the selected user (MS-B) (step C2) and, upon receipt of this release instruction, the selected user (MS-B) releases the radio connection with respect to the BS 1 and returns a response to the release instruction to the BS 1 (step C3). Thus, the selected user (MS-B) becomes a DORMANT state where only the PDSN 105 and the PPP link are maintained (step C4), and an ACTIVE user resource is made free in the BS 1 (step C5).

That is, at that time, the number of ACTIVE user resources in the BS 1 decrease by one and becomes 29 (one free resource), while the number of DORMANT user resources increases by one and becomes three. Incidentally, for example, a paging channel is used for the transmission of the aforesaid release instruction and an access channel is used for the return of the response.

Following this, the BS 1 (control unit 32) allocates the free resource of the ACTIVE resources, obtained by shifting the ACTIVE user (MS-B) to the DORMANT user as mentioned above, for conducting the connection processing answering a new connection request from a new user (MS-A), and carries out the connection processing between the new user (MS-A) and the PDSN 105 to establish a PPP link (steps C6 to C8). This connection processing is conducted similarly to the procedure in the steps A5 to A13 and A17 described with reference to FIG. 3 (the connection sequence with the authentication server 105 is omitted).

When the PPP link is established between the new user (MS-A)—the PDSN 105 in this way, the BS 1 (control unit 32) then issues a radio connection release instruction to the new user (MS-A) for shifting that new user (MS-A) to a DORMANT state (step C9) and, upon receipt of this release instruction, the new user (MS-A) releases the radio connection with respect to the BS 1 and returns a response to the release instruction to the BS 1 (step C10). In consequence, the new user (MS-A) comes into a DORMANT state in which only the PDSN 105 and the PPP link are maintained (step C11). Incidentally, for example, a paging channel and an access channel are used for the release instruction and the return of the response also in this case.

Subsequently, the BS 1 (control unit 32) issues a connection request to the selected user (MS-A) forcibly shifted to the DORMANT state (the identification information on the forcibly-shifted MS-A is stored in the control unit 32 and the MS-A is specified using this identification information) for again returning the selected user (MS-A) to the ACTIVE state (step C12), and carries out the connection processing (processing for establishing a radio connection) with respect to selected user (MS-A) (step C13). In this case, for example, a paging channel is used for the transmission of the connection request.

As described above, according to this embodiment, in a case in which a new connection request occurs in a state where the ACTIVE users reach the fully-used condition, one of the existing ACTIVE users is temporarily shifted forcibly to a DORMANT state and the connection processing on the new user is implemented through the use of the ACTIVE user made free in this way so that the new user is once placed into the ACTIVE state and then forcibly shifted to the DORMANT state where a free resource exists. Therefore, as in the case of the first embodiment, this also can effectively utilize the resources, placed under the management of the BS 1, to the fullest extent to suppress the decrease in maximum number of users (ACTIVE users+DORMANT users) which can be accommodated in the BS 1, and can make the number of times of connection busy on the user side decrease considerably.

Figure 6:
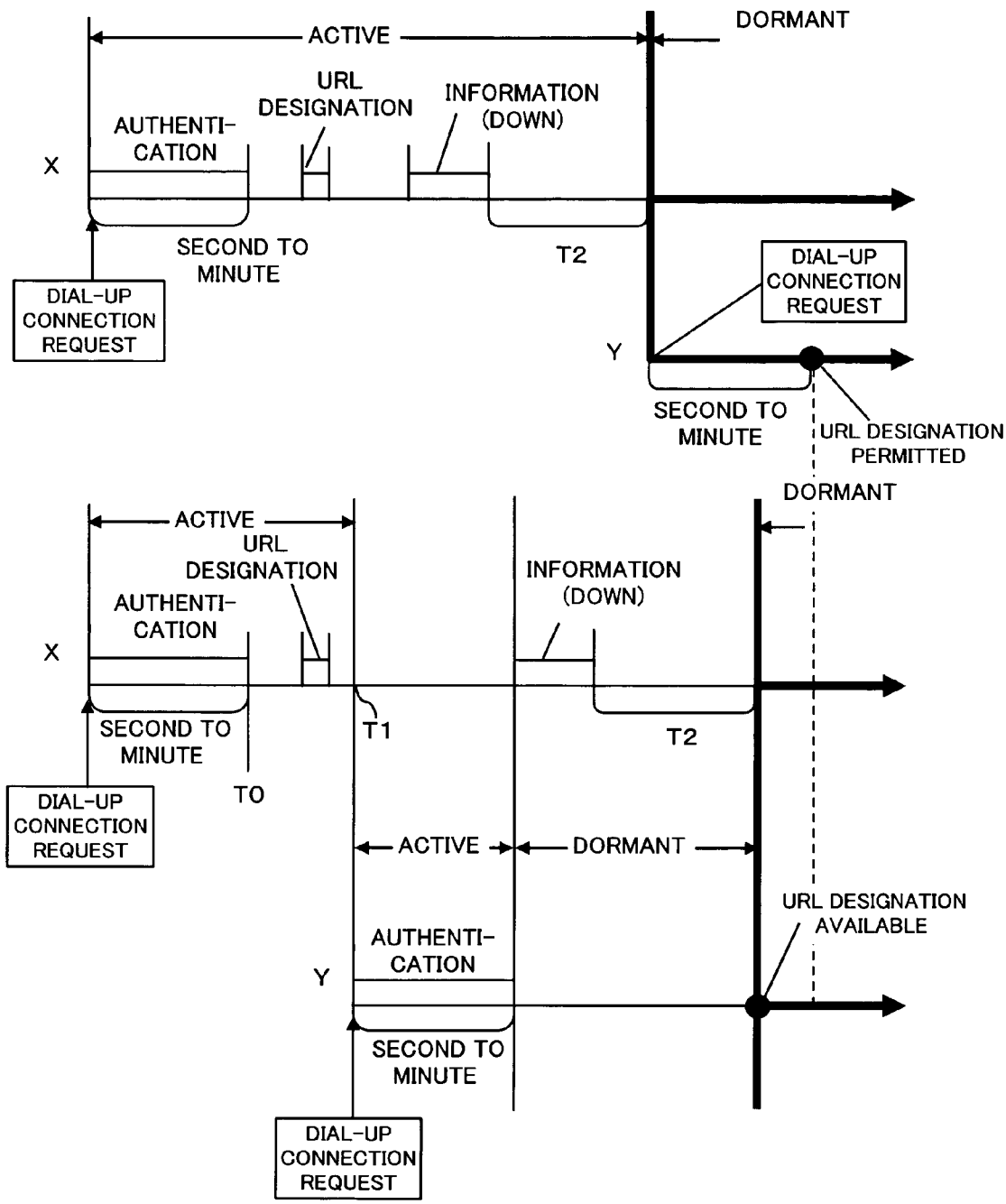
FIG. 6 is an illustration for explaining the effects to be attainable by the second embodiment in comparison with a conventional technique.
Figure 11:
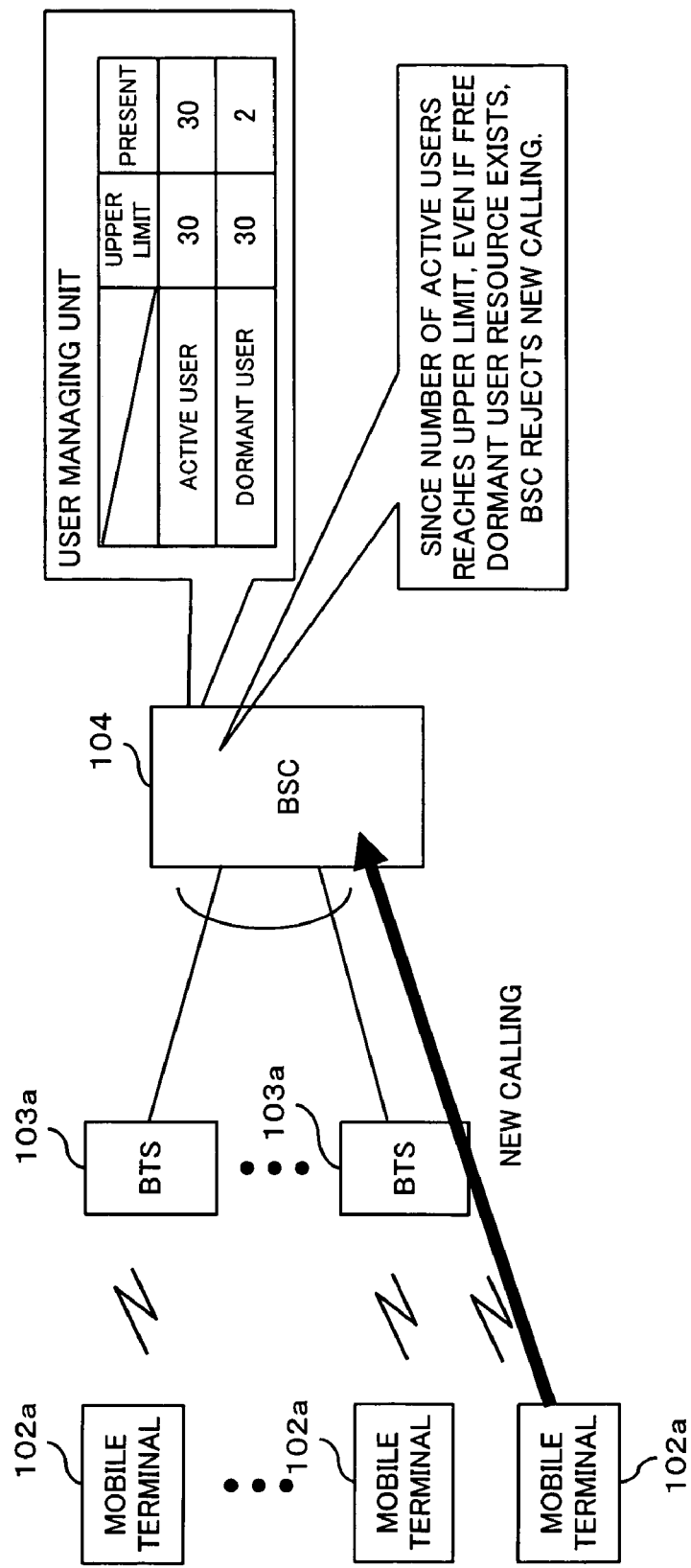
FIGS. 11 and 12 are block diagrams for explaining the problems arising with the existing mobile communication system.
Figure 12:
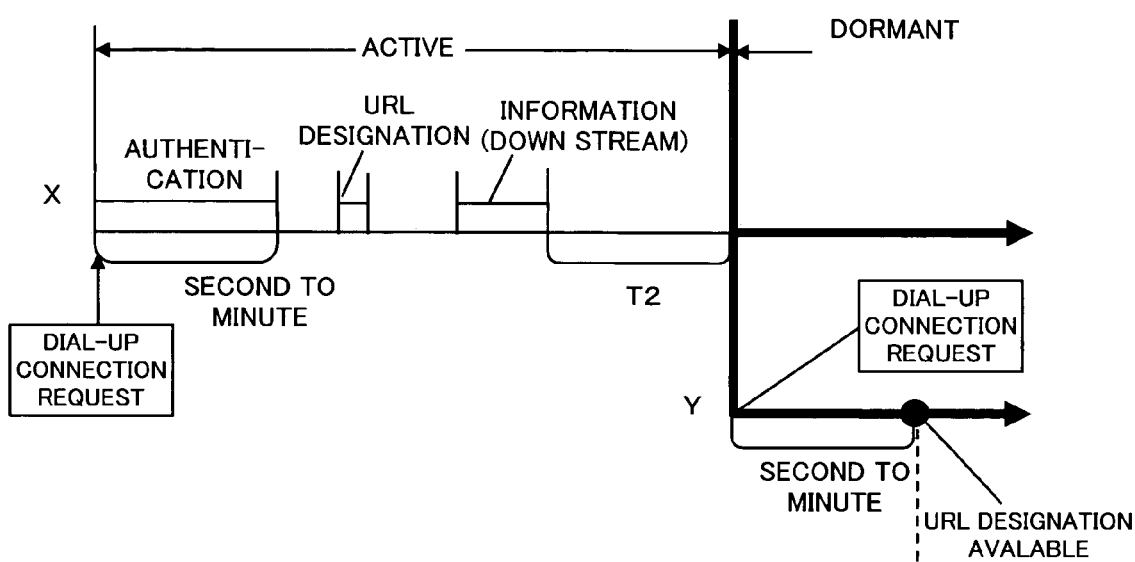

That is, for example, as shown in FIG. 6, as in the case described with reference to FIG. 11, assuming a case in which the upper limit of number of ACTIVE users is "1" and the number of DORMANT users is equal to or more than 2, a new calling terminal (PC) Y can make the connection after the time T1 at which the terminal X is forcibly shifted from the ACTIVE state to the DORMANT state. Incidentally, the forcible shifting of the ACTIVE user to the DORMANT state can be made after the time T0 at which the authentication processing on the terminal X reaches completion in FIG. 6 and, hence, the terminal Y becomes connectable after the time T0 at the earliest.

In addition, according to this embodiment, since, when a new user is placed into a DORMANT state, the user forcibly shifted to a DORMANT state for that new user is again returned to the ACTIVE user, the period of time in which the ACTIVE user is forcibly placed into the DORMANT state is a short time until the connection processing for the new user reaches completion, which minimizes the influence on the communication by the existing ACTIVE user.

(B1) DESCRIPTION OF FIRST MODIFICATION OF SECOND EMBODIMENT

Although in the above-described second embodiment the user forcibly shifted from the ACTIVE state to the DORMANT state is always returned to the ACTIVE state, it is also acceptable to employ a method in which the user is not returned thereto according to the normal "condition of transition from an ACTIVE user to a DORMANT user" (when a state in which the actual transmission/reception of packet data does not occur continues for a constant period of time, or other cases) and "condition of transition from a DORMANT state to an ACTIVE state" (when another URL is designated by a user, when packet data addressed to a user arrives at the BS 1, or other cases).

Figure 7:
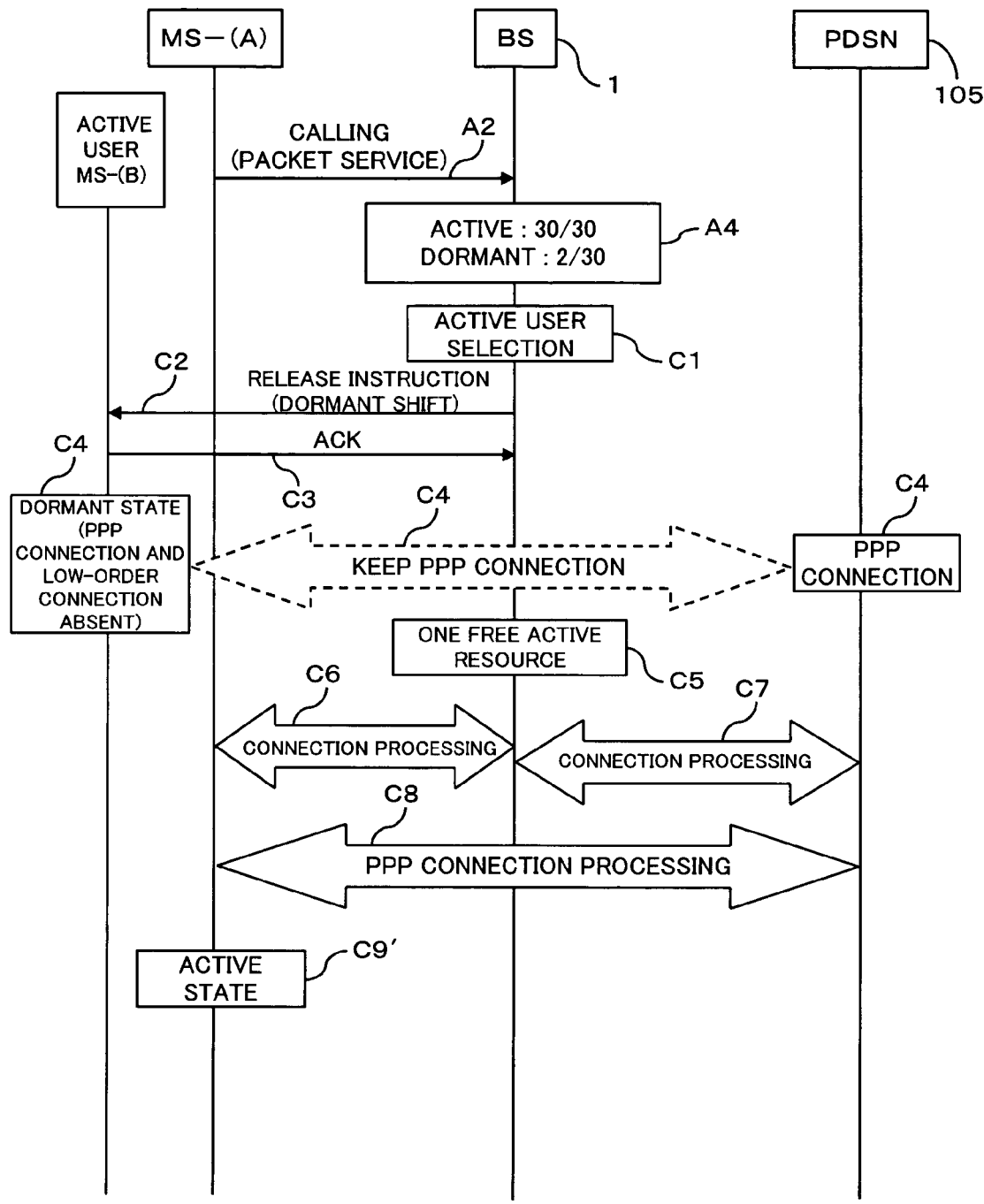
FIG. 7 is a sequence diagram for explaining connection processing according to a first modification of the second embodiment.

That is, the processing similar to that in the steps A4 and C1 to C8 in FIG. 5 is conducted, for example, as shown in FIG. 7 and, after a new user (MS-A) comes into an ACTIVE state, if the selected user (MS-B) forcibly shifted to a DORMANT state is maintainable in the DORMANT state, the new user (MS-A) is maintained in the ACTIVE state (step C9'), and the user (MS-B) forcibly shifted to the DORMANT state becomes an ACTIVE state according to the normal transition condition (for example, when another URL is designated or when packet data addressed to the user (MS-B) arrives at the BS 1, if a free ACTIVE user resource exists, the transition to the ACTIVE state is feasible).

Accordingly, also in this modification, as in the case of the second embodiment, the effective utilization of the resources needed for the packet communication is achievable and the early connection of the new user (MS-A) becomes feasible, and the service performance of the packet communication becomes improvable.

(B2) DESCRIPTION OF SECOND MODIFICATION OF SECOND EMBODIMENT

Furthermore, although in the above-described second embodiment the user (MS-B) forcibly shifted from the ACTIVE state to the DORMANT state is returned to the ACTIVE state without condition (the new user (MS-A) is forcibly shifted to the DORMANT state), it is also acceptable that this shifting is conducted or non-conducted in accordance with the presence or absence of a user which desires the shifting from the DORMANT state to the ACTIVE state at that time (a user for which another URL designation occurs, a user for which packet data from the PDSN 105 arrives at the BS 1, and others: which will hereinafter be referred to as an ACTIVE state shift desiring user).

Figure 8:
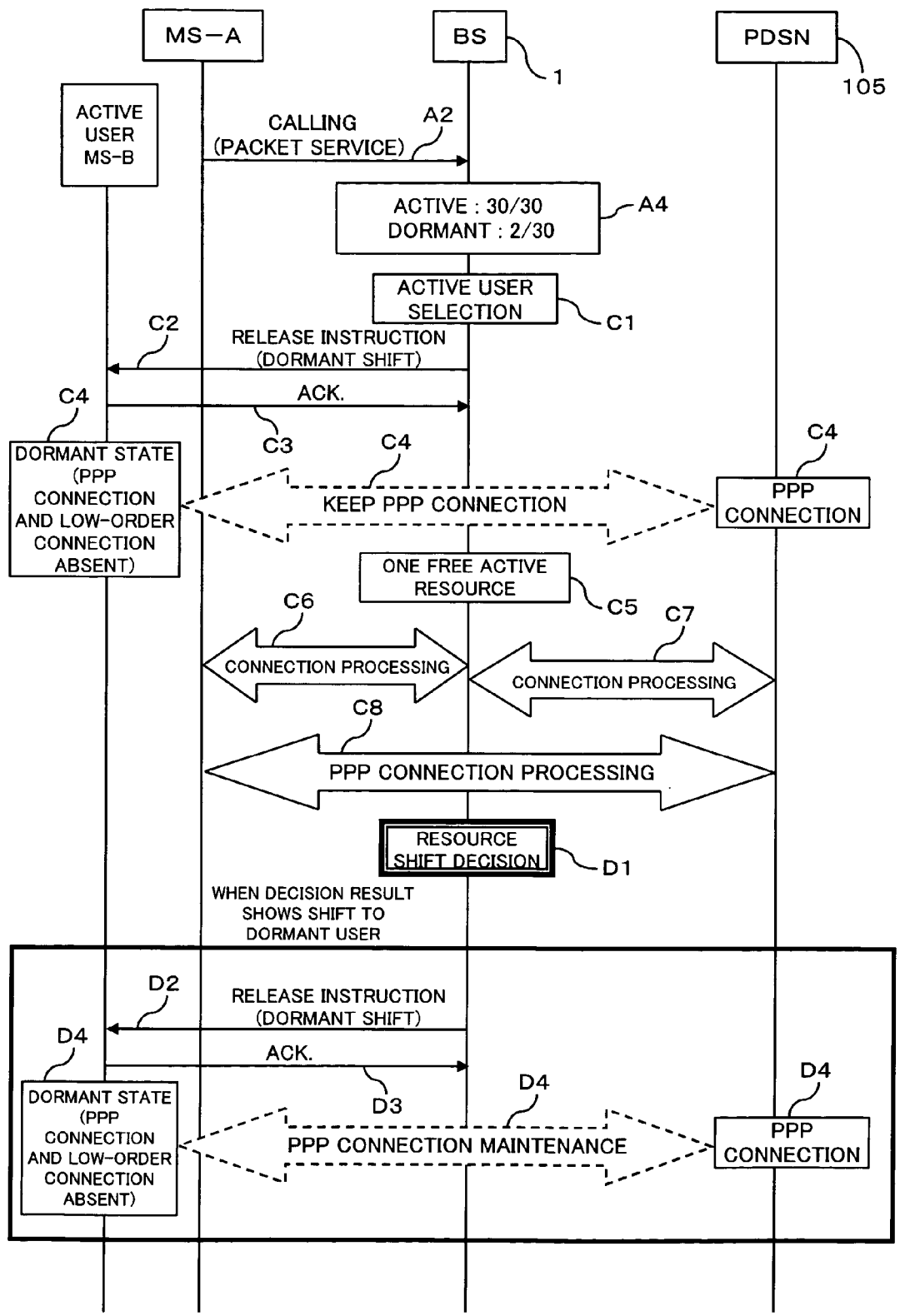
FIG. 8 is a sequence diagram for explaining connection processing according to a second modification of the second embodiment.

That is, the processing similar to that in the steps A4 and C1 to C8 in FIG. 5 is conducted, for example, as shown in FIG. 8 and, after a new user (MS-A) comes into an ACTIVE state, in BS 1, the control unit 32 checks whether or not an ACTIVE state shift desiring user exists (resource shift decision: step D1). If the check result shows the presence of the ACTIVE state shift desiring unit, a decision is made that the new user (MS-A) is to be shifted to a DORMANT state and a release instruction is issued to the new user (MS-A) for releasing the radio connection with respect to the new user (MS-A) (step D2).

Upon receipt of this release instruction, the new user (MS-A) releases the radio connection with respect to the MS 1 and returns a response to the aforesaid release instruction (step D3). Thus, the new user (MS-A) becomes a DORMANT state maintaining only the PDSN 105 and the PPP link (step D4). Also in this case, for example, a paging channel and an access channel are used for the transmissions of the release instruction and the response, respectively.

On the other hand, in the case of the absence of the ACTIVE state shift-desiring user, the BS 1 (control unit 32) maintains the new user (MS-A) in the ACTIVE state.

That is, in the case of the absence of the ACTIVE state shift desiring user, the ACTIVE state of the new user is maintained, and in a case in which an ACTIVE state shift desiring user [including the user (MS-B)] exists, the desire of this ACTIVE state shift desiring user is put first and the new user is forcibly shifted to a DORMANT state.

Therefore, the connection processing which meets the requirements on both the new user and existing ACTIVE user becomes possible while improving the effective utilization and connectivity of the resources needed for the packet communication, and further improvement of the service performance of the packet communication becomes feasible.

(C) Description of Method of Determining ACTIVE State→DORMANT State Compelling-Shift User Secondly, a description will be given hereinbelow of a method (criterion) of selecting (determining) an ACTIVE user, to be forcibly shifted to a DORMANT state, in the DORMANT shift terminal determining unit 321 for carrying out the connection processing answering a new connection request from a new user (MS-A) in the above-described second embodiment and first and second modifications thereof.

For example, for this ACTIVE user determining method, there are considered (1) a case using a period of time of the registration as a new ACTIVE user, (2) a case using a management number under the management of the BS 1 (user having a management No. 1 or user having the last management number), (3) a case using the counts of repetition of the ACTIVE state and the DORMANT state, (4) a case using a transmission/reception data rate with respect to a period of time of the connection as the ACTIVE user, (5) a case using a period of time until the timer runout at which the transition from the ACTIVE to the DORMANT takes place, and other cases.

A description will be given hereinbelow of concrete examples of the respective cases.

(1) Case using Period of Time of Registration as New ACTIVE User

For example, let it be assumed that ACTIVE users A, B and C exist and the elapsed time periods after they have newly become an ACTIVE user are T=g, T=h (h<g) and T=i (i<h). In this case, as the user to be forcibly shifted to the DORMANT state, the control unit 32 (DORMANT shift terminal determining unit 321) selects the user A in the case of selecting the user taking the longest connection time and the user C in the case of conversely selecting the user taking the shortest connection time.

(2) Case Using Management Number Managed in the BS 1 (Concretely, BSC 1b) (User Having Management No. 1 or User Having Last Management Number)

For example, let it be assumed that ACTIVE users A, B and C exist and the management numbers of the respective ACTIVE users managed in the BS 1 are "1", "2" and "3", respectively. In this case, as the user to be forcibly shifted to the DORMANT state, the control unit 32 (DORMANT shift terminal determining unit 321) selects the user A in the case of selecting the user having the smallest management number and the user C in the case of selecting the user having the largest management number.

(3) Case Using Counts of Repetition of ACTIVE User and DORMANT User

For example, let it be assumed that ACTIVE users A, B and C exist and the numbers of times of transition of a DORMANT state→an ACTIVE state→a DORMANT state of the respective ACTIVE users after becoming a new ACTIVE user are A (ACTIVE frequency)=5/D (DORMANT frequency)=4, A=3/D=2 and A1/D=0, respectively. In this case, as the user to be forcibly shifted to the DORMANT state, the control unit 32 (DORMANT shift terminal determining unit 321) selects the user A in the case of selecting the user having the largest number of times of repetition of the ACTIVE/DORMANT states and the user C, conversely, in the case of selecting the user having the smallest number of times thereof.

(4) Case Using Transmission/Reception Data Rate (Average Transfer Rate) with Respect to Period of Time of Connection as ACTIVE User For example, let it be assumed that ACTIVE users A, B and C exist and the transmission/reception data rates relative to the connections of the respective ACTIVE users are 2000 kbit/200 sec=10 kbps, 40000 kbit/10000 sec=4 kbps and 3000 kbit/30 sec=100 kbps, respectively. In this case, as the user to be forcibly shifted to the DORMANT state, the control unit 32 (DORMANT shift terminal determining unit 321) selects the user B in the case of selecting the user having the lowest average transfer rate and the user C in the case of selecting the user having the highest average transfer rate.

(5) Case Using Period of Time Until Timer Runout at Which Transition from ACTIVE to DORMANT Takes Place For example, let it be assumed that ACTIVE users A, B and C exist and the time periods taken until the respective ACTIVE users transit to a DORMANT user are T=p, T=q (q>p) and T=r (r>q), respectively. In this case, as the user to be forcibly shifted to the DORMANT state, the control unit 32 (DORMANT shift terminal determining unit 321) selects the user A in the case of selecting the user having the shortest time until the transition to the DORMANT user and the user C, conversely, in the case of selecting the user having the longest time.

When a needed criterion (condition) is set in accordance with the system requirements in this way, it is possible to reduce that the subscriber to be forcibly shifted from the active state to the dormant state inclines toward a portion of subscribers. Incidentally, the various kinds of conditions in the aforesaid (1) to (5) can also be set in the form of a proper combination.

(D) Others

Moreover, the present invention is not limited to the above-described first and second embodiments, and that it is intended to cover all changes of the embodiments of the invention herein which do not constitute departures from the spirit and scope of the invention.

For example, the above-described first and second embodiments can also be implemented in the form of a combination thereof. That is, it is also appropriate that a radio resource for the immediate-shifting to a DORMANT state is prepared in advance and, in a case in which this radio resource is not in a free condition, a portion of ACTIVE users is forcibly shifted to a DORMANT state to create a free radio resource.

INDUSTRIAL APPLICABILITY

As described above, according to the present invention, in a case in which ACTIVE user resources needed for the processing for the connection with a user are in a full condition and DORMANT resources are in a free condition, the connection processing answering a new connection request is conducted through the use of a "DORMANT immediate-shift resource" secured in advance or a free resource created by forcibly shifting a portion of ACTIVE users to a DORMANT state, thereby making packet communications with a new user. Therefore, the total resource (ACTIVE/DORMANT resource) for use in the packet communication is available without waste and the packet service connectivity to users is considerably improvable and, hence, it is considered that the usability thereof is extremely high.

The invention claimed is:

1. A station side apparatus made to manage a communication resource needed for making packet data communication with a plurality of subscriber terminals and to allocate said communication resource to said subscriber terminal according to a connection request from said subscriber terminal for making the packet data communication with said subscriber terminal, characterized by comprising:

an active subscriber resource managing unit for managing a communication resource needed for implementing connection processing in which, in response to a connection request from one subscriber terminal, a communication link with said subscriber terminal is established so that packet data communication with said subscriber terminal is placed into an active state;

a dormant subscriber resource managing unit for managing a communication resource needed for maintaining a communication link other than at least a radio zone when said subscriber terminal which is in said active state shifts to a dormant state in which no packet data transmission actually takes place;

a dormant state shift resource managing unit for managing a radio resource to be used for said subscriber terminal to be shifted to said dormant state after the implementation of said connection processing; and a control unit for, upon receipt of a new connection request from a subscriber terminal which is not in said active state nor in said dormant state, even if a free radio resource is absent in said active subscriber resource managing unit, carrying out connection processing answering said new connection request through the use of a radio resource secured in advance in said dormant state shift resource managing unit to control packet data communication with said subscriber terminal, issuing said new connection request, into an active state, wherein said control unit once places said subscriber terminal issuing said new connection request into said active state and then immediately shifts said subscriber terminal to said dormant state when the free radio resource is absent in said active subscriber resource managing unit.

2. The station side apparatus according to claim 1, characterized in that said control unit includes means for, after the packet data communication with said subscriber terminal issuing said new connection request is controlled into said active state, forcibly shifting the packet data communication to a dormant state.

3. The station side apparatus according to claim 2, characterized in that said control unit includes dormant state shift terminal determining means for, upon receipt of said new connection request, determining said subscriber terminal to be forcibly shifted to said dormant state, on the basis of a predetermined condition.

4. The station side apparatus according to claim 3, characterized in that said dormant state shift terminal determining means is made to determine said subscriber terminal to be forcibly shifted to said dormant state, on the basis of, as said predetermined condition, an elapsed time period after said subscriber terminal is placed into said active state.

5. The station side apparatus according to claim 3, characterized in that said dormant state shift terminal determining means is made to determine said subscriber terminal to be forcibly shifted to said dormant state, on the basis of, as said predetermined condition, a management number of said subscriber terminal placed into said active state.

6. The station side apparatus according to claim 3, characterized in that said dormant state shift terminal determining means is made to determine said subscriber terminal to be forcibly shifted to said dormant state, on the basis of, as said predetermined condition, the number of times of state transition of said subscriber terminal to an active state and a dormant state within a constant period of time.

7. The station side apparatus according to claim 3, characterized in that said dormant state shift terminal determining means is made to determine said subscriber terminal to be forcibly shifted to said dormant state, on the basis of, as said predetermined condition, a packet data communication rate while said subscriber terminal is in an active state.

8. The station side apparatus according to claim 3, characterized in that said dormant state shift terminal determining means is made to determine said subscriber terminal to be forcibly shifted to said dormant state, on the basis of, as said predetermined condition, a period of time taken from which said subscriber terminal becomes an active state until said subscriber terminal shifts to a dormant state.

9. A station side apparatus made to manage a communication resource needed for making packet data communication with a plurality of subscriber terminals and to allocate said communication resource to said subscriber terminal according to a connection request from said subscriber terminal for making the packet data communication with said subscriber terminal, characterized by comprising:

an active subscriber resource managing unit for managing a communication resource needed for implementing connection processing in which, in response to a connection request from one subscriber terminal, a communication link with said subscriber terminal is established so that packet data communication with said subscriber terminal is placed into an active state;

a dormant subscriber resource managing unit for managing a communication resource needed for maintaining a communication link other than at least a radio zone when said subscriber terminal placed into said active state is shifted to a dormant state in which no packet data transmission actually takes place; and a control unit for, upon receipt of a new connection request from a subscriber terminal which is not in said active state nor in said dormant state, if a radio resource secured in advance is absent, forcibly shifting a portion of subscriber terminals placed into an active state to a dormant state to produce a free resource from a radio resource and for carrying out connection processing answering said new connection request through the use of the free radio resource to control packet data communication with said subscriber terminal issuing said new connection request into an active state, wherein said control unit once places said subscriber terminal issuing said new connection request into said active state and then immediately shifts said subscriber terminal to said dormant state when the radio resource secured in advance is absent.

10. The station side apparatus according to claim 9, characterized in that said control unit includes means for, after the packet data communication with said subscriber terminal issuing said new connection request is controlled into said active state, forcibly shifting the packet data communication to a dormant state and returning the packet data communication with said subscriber terminal, forcibly shifted to said dormant state so that said radio resource is made free, to an active state.

11. The station side apparatus according to claim 10, characterized in that said control unit includes dormant state shift terminal determining means for, upon receipt of said new connection request, determining said subscriber terminal to be forcibly shifted to said dormant state, on the basis of a predetermined condition.

12. The station side apparatus according to claim 9, characterized in that said control unit includes dormant state shift terminal determining means for, upon receipt of said new connection request, determining said subscriber terminal to be forcibly shifted to said dormant state, on the basis of a predetermined condition.

13. The station side apparatus according to claim 12, characterized in that said dormant state shift terminal determining means is made to determine said subscriber terminal to be forcibly shifted to said dormant state, on the basis of, as said predetermined condition, an elapsed time period after said subscriber terminal is placed into said active state.

14. The station side apparatus according to claim 12, characterized in that said dormant state shift terminal determining means is made to determine said subscriber terminal to be forcibly shifted to said dormant state, on the basis of, as said predetermined condition, a management number of said subscriber terminal placed into said active state.

15. The station side apparatus according to claim 12, characterized in that said dormant state shift terminal determining means is made to determine said subscriber terminal to be forcibly shifted to said dormant state, on the basis of, as said predetermined condition, the number of times of state transition of said subscriber terminal to an active state and a dormant state within a constant period of time.

16. The station side apparatus according to claim 12, characterized in that said dormant state shift terminal determining means is made to determine said subscriber terminal to be forcibly shifted to said dormant state, on the basis of, as said predetermined condition, a packet data communication rate while said subscriber terminal is in an active state.

17. The station side apparatus according to claim 12, characterized in that said dormant state shift terminal determining means is made to determine said subscriber terminal to be forcibly shifted to said dormant state, on the basis of, as said predetermined condition, a period of time taken from which said subscriber terminal becomes an active state until said subscriber terminal shifts to a dormant state.

18. A resource allocating method in a station side apparatus made to manage a communication resource needed for making packet data communication with a plurality of subscriber terminals and to allocate said communication resource to said subscriber terminal according to a connection request from said subscriber terminal for making the packet data communication with said subscriber terminal, characterized by:

managing a communication resource needed for implementing connection processing in which, in response to a connection request from one subscriber terminal, a communication link with said subscriber terminal is established so that packet data communication with said subscriber terminal is placed into an active state, a communication resource needed for maintaining a communication link other than at least a radio zone when said subscriber terminal which is in said active state shifts to a dormant state in which no packet data transmission actually takes place, and a radio resource to be used for said subscriber terminal to be shifted to said dormant state after the implementation of said connection processing;

upon receipt of a new connection request from a subscriber terminal which is not in said active state nor in said dormant state, making a decision as to whether or not said communication resource is in a free condition in said dormant subscriber resource managing unit;

when said communication resource is in a free condition, even if a free radio resource is absent in said active subscriber resource managing unit, carrying out connection processing answering said new connection request through the use of a radio resource secured in advance for shifting to said dormant state to control packet data communication with said subscriber terminal, issuing said new connection request, into an active state; and placing said subscriber terminal issuing said new connection request into said active state and then immediately shifting said subscriber terminal to said dormant state when the free radio resource is absent in said active subscriber resource managing unit.

19. The resource allocating method in a station side apparatus according to claim 18, characterized in that, after the packet data communication with said subscriber terminal issuing said new connection request is controlled into said active state, forcibly shifting the packet data communication to a dormant state.

20. The resource allocating method in a station side apparatus according to claim 19, characterized in that, upon receipt of said new connection request, said subscriber terminal to be forcibly shifted to said dormant state is determined on the basis of a predetermined condition.

21. The resource allocating method in a station side apparatus according to claim 20, characterized in that said subscriber terminal to be forcibly shifted to said dormant state is determined on the basis of, as said predetermined condition, an elapsed time period after said subscriber terminal is placed into said active state.

22. The resource allocating method in a station side apparatus according to claim 20, characterized in that said subscriber terminal to be forcibly shifted to said dormant state is determined on the basis of, as said predetermined condition, a management number of said subscriber terminal placed into said active state.

23. The resource allocating method in a station side apparatus according to claim 20, characterized in that said subscriber terminal to be forcibly shifted to said dormant state is determined on the basis of, as said predetermined condition, the number of times of state transition of said subscriber terminal to an active state and a dormant state within a constant period of time.

24. The resource allocating method in a station side apparatus according to claim 20, characterized in that said subscriber terminal to be forcibly shifted to said dormant state is determined on the basis of, as said predetermined condition, a packet data communication rate while said subscriber terminal is in an active state.

25. The resource allocating method in a station side apparatus according to claim 20, characterized in that said subscriber terminal to be forcibly shifted to said dormant state is determined on the basis of, as said predetermined condition, a period of time taken from which said subscriber terminal becomes an active state until said subscriber terminal shifts to a dormant state.

26. A resource allocating method in a station side apparatus made to manage a communication resource needed for making packet data communication with a plurality of subscriber terminals and to allocate said communication resource to said subscriber terminal according to a connection request from said subscriber terminal for making the packet data communication with said subscriber terminal, characterized by:

managing a communication resource needed for implementing connection processing in which, in response to a connection request from one subscriber terminal, a communication link with said subscriber terminal is established so that packet data communication with said subscriber terminal is placed into an active state and a communication resource needed for maintaining a communication link other than at least a radio zone when said subscriber terminal placed into said active state is shifted to a dormant state in which no packet data transmission actually takes place;

upon receipt of a new connection request from a subscriber terminal which is not in said active state nor in said dormant state, if a radio resource secured in advance is absent, forcibly shifting a portion of subscriber terminals placed into an active state to a dormant state to make a radio resource free;

carrying out connection processing answering said new connection request through the use of the free radio resource to control packet data communication with said subscriber terminal issuing said new connection request into an active state; and placing aid subscriber terminal issuing said new connection request into said active state and then immediately shifting said subscriber terminal to said dormant state when the radio resource secured in advance is absent.

27. The resource allocating method in a station side apparatus according to claim 26, characterized in that, after the packet data communication with said subscriber terminal issuing said new connection request is controlled into said active state, forcibly shifting the packet data communication to a dormant state and returning the packet data communication with said subscriber terminal, forcibly shifted to said dormant state so that said radio resource is made free, to an active state.

28. The resource allocating method in a station side apparatus according to claim 27, characterized in that, upon receipt of said new connection request, said subscriber terminal to be forcibly shifted to said dormant state is determined on the basis of a predetermined condition.

29. The resource allocating method in a station side apparatus according to claim 26, characterized in that, upon receipt of said new connection request, said subscriber terminal to be forcibly shifted to said dormant state is determined on the basis of a predetermined condition.

30. The resource allocating method in a station side apparatus according to claim 29, characterized in that said subscriber terminal to be forcibly shifted to said dormant state is determined on the basis of, as said predetermined condition, an elapsed time period after said subscriber terminal is placed into said active state.

31. The resource allocating method in a station side apparatus according to claim 29, characterized in that said subscriber terminal to be forcibly shifted to said dormant state is determined on the basis of, as said predetermined condition, a management number of said subscriber terminal placed into said active state.

32. The resource allocating method in a station side apparatus according to claim 29, characterized in that said subscriber terminal to be forcibly shifted to said dormant state is determined on the basis of, as said predetermined condition, the number of times of state transition of said subscriber terminal to an active state and a dormant state within a constant period of time.

33. The resource allocating method in a station side apparatus according to claim 29, characterized in that said subscriber terminal to be forcibly shifted to said dormant state is determined on the basis of, as said predetermined condition, a packet data communication rate while said subscriber terminal is in an active state.

34. The resource allocating method in a station side apparatus according to claim 29, characterized in that said subscriber terminal to be forcibly shifted to said dormant state is determined on the basis of, as said predetermined condition, a period of time taken from which said subscriber terminal becomes an active state until said subscriber terminal shifts to a dormant state.

35. A mobile communication system including a radio base station for making a connection through a radio channel with respect to a subscriber terminal and a logical connection unit for making a logical connection with respect to said subscriber terminal through the use of said connection, and having a function to release the radio channel connection on one subscriber terminal while maintaining said logical connection with said subscriber terminal in accordance with a situation of a communication using said logical connection with said subscriber terminal, characterized by comprising control means for, when a connection request occurs from a subscriber terminal, even if a free radio channel runs short, permitting the radio channel connection through the use of a radio resource secured in advance on the condition that said subscriber terminal is at least once exposed to the release, wherein said control means once places said subscriber terminal issuing said connection request into said active state and then immediately shifts said subscriber terminal to said dormant state when the free radio channel runs short.

36. A mobile communication system including a radio base station for making a connection through a radio channel with respect to a subscriber terminal and a logical connection unit for making a logical connection with respect to said subscriber terminal through the use of said connection, and having a function to release the radio channel connection on one subscriber terminal while maintaining said logical connection with said subscriber terminal in accordance with a situation of a communication using said logical connection with said subscriber terminal, characterized by comprising control means for, when a connection request occurs from one subscriber terminal, if a radio resource secured in advance is absent, making another subscriber terminal exposed to the release and allocating a radio channel, made free by the release on said another subscriber terminal, to said one subscriber terminal on the condition that said one subscriber terminal is at least once exposed to the release and for, after the release on said one subscriber terminal, allocating a free radio channel to said another subscriber terminal, wherein said control means once places said subscriber terminal issuing said connection request into said active state and then immediately shifts said subscriber terminal to said dormant state when the radio resource secured in advance is absent.

* * * * *